(12) United States Patent
Gaudreau, Jr.

(10) Patent No.: US 8,585,138 B2
(45) Date of Patent: Nov. 19, 2013

(54) RIGIDIFYING SYSTEM FOR SINGLE SHELL JUVENILE VEHICLE SEAT

(75) Inventor: Paul D. Gaudreau, Jr., Indianapolis, IN (US)

(73) Assignee: Cosco Management, Inc., Wilmington, DE (US)

( * ) Notice: Subject to any disclaimer, the term of this patent is extended or adjusted under 35 U.S.C. 154(b) by 72 days.

(21) Appl. No.: 13/280,989

(22) Filed: Oct. 25, 2011

(65) Prior Publication Data
US 2012/0098304 A1  Apr. 26, 2012

Related U.S. Application Data

(60) Provisional application No. 61/406,884, filed on Oct. 26, 2010.

(51) Int. Cl.
| | |
|---|---|
| B60N 2/42 | (2006.01) |
| B60N 2/26 | (2006.01) |
| B60N 2/28 | (2006.01) |
| B60R 22/10 | (2006.01) |

(52) U.S. Cl.
USPC .................................. 297/216.11; 297/250.1

(58) Field of Classification Search
USPC .............................. 297/216.11, 250.1–256.16
See application file for complete search history.

(56) References Cited

U.S. PATENT DOCUMENTS

| | | |
|---|---|---|
| 3,992,056 A | 11/1976 | Koziatek et al. |
| 4,033,622 A * | 7/1977 | Boudreau ................. 297/256.13 |
| 4,183,580 A | 1/1980 | Johansson |
| 4,613,188 A | 9/1986 | Tsuge et al. |
| 4,632,456 A | 12/1986 | Kassai |
| 5,082,325 A | 1/1992 | Sedlack |
| 5,366,271 A | 11/1994 | Johnston et al. |
| 5,449,216 A * | 9/1995 | Gierman et al. ......... 297/216.11 |
| 5,468,044 A * | 11/1995 | Coman .................... 297/216.11 |
| 5,468,046 A | 11/1995 | Weber et al. |
| 5,639,144 A * | 6/1997 | Naujokas ............. 297/216.11 X |
| 6,338,529 B1 * | 1/2002 | David et al. ................ 297/250.1 |
| 6,386,632 B1 * | 5/2002 | Goor et al. ............... 297/216.11 |
| 6,398,302 B1 | 6/2002 | Freedman et al. |
| 6,679,550 B2 * | 1/2004 | Goor et al. ............... 297/216.11 |
| 6,764,135 B2 | 7/2004 | Sasaki et al. |
| 6,808,232 B2 | 10/2004 | Takizawa |
| 6,817,673 B2 | 11/2004 | Walker et al. |
| 7,086,695 B2 * | 8/2006 | Hosoya .................... 297/256.16 |
| 7,246,854 B2 | 7/2007 | Dingman et al. |
| 7,344,192 B2 | 3/2008 | Kespohl |
| 7,380,878 B2 | 6/2008 | Clement et al. |
| 7,467,824 B2 * | 12/2008 | Nakhla et al. ............ 297/216.11 |
| 7,472,952 B2 | 1/2009 | Nakhla et al. |
| 7,475,941 B2 | 1/2009 | Clement et al. |
| 7,484,801 B2 * | 2/2009 | Kassai et al. ............. 297/256.16 |
| 8,186,757 B2 * | 5/2012 | Duncan et al. ........... 297/256.13 |
| 8,393,674 B2 * | 3/2013 | Keegan et al. ........... 297/216.11 |
| 8,474,907 B2 * | 7/2013 | Weber et al. ............. 297/256.16 |
| 2005/0110315 A1 | 5/2005 | Littlehorn et al. |
| 2006/0006712 A1 | 1/2006 | Clement et al. |
| 2006/0163923 A1 * | 7/2006 | Baumann et al. ............. 297/254 |
| 2009/0200842 A1 | 8/2009 | Goldberg et al. |

(Continued)

*Primary Examiner* — Rodney B White
(74) *Attorney, Agent, or Firm* — Barnes & Thornburg LLP

(57) ABSTRACT

A child restraint includes a juvenile seat including a seat shell and a rigidifying structure for the seat shell. The seat shell includes a seat bottom and a seat back extending upwardly from the seat bottom.

24 Claims, 7 Drawing Sheets

(56) References Cited

U.S. PATENT DOCUMENTS

| | | |
|---|---|---|
| 2012/0098304 A1* | 4/2012 | Gaudreau, Jr. ........... 297/216.11 |
| 2012/0098309 A1* | 4/2012 | Gaudreau et al. ...... 297/250.1 X |
| 2012/0146369 A1* | 6/2012 | Gaudreau, Jr. ........... 297/216.11 |
| 2012/0153690 A1* | 6/2012 | Gaudreau, Jr. ............. 297/250.1 |
| 2012/0175921 A1* | 7/2012 | Gaudreau, Jr. ....... 297/256.11 X |
| 2012/0306243 A1* | 12/2012 | Oltman et al. ........... 297/216.11 |

* cited by examiner

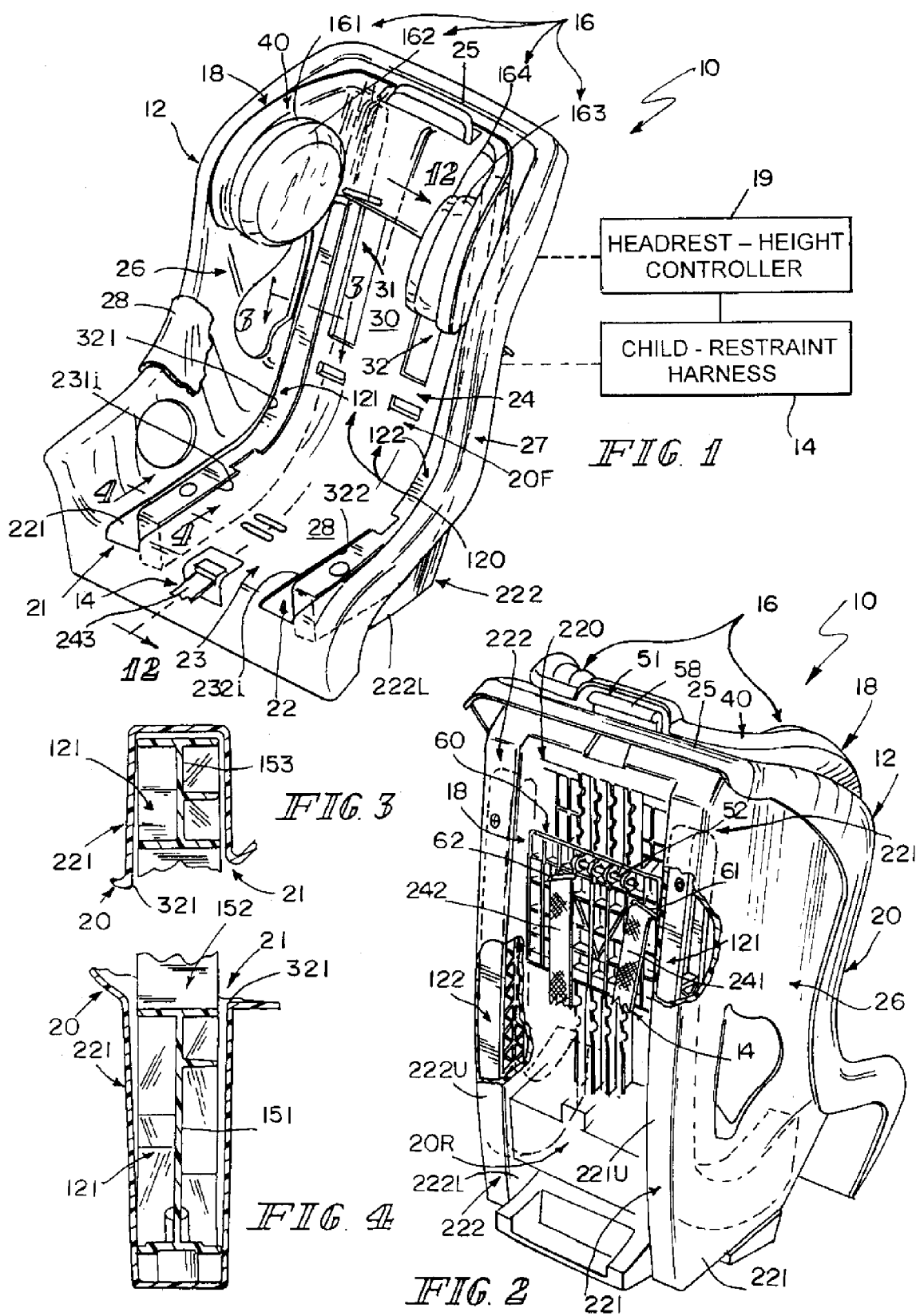

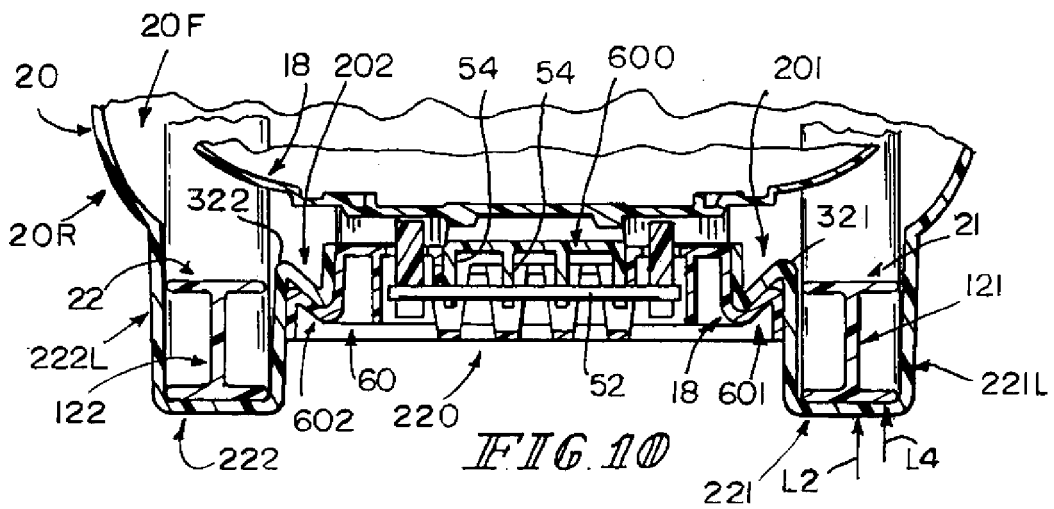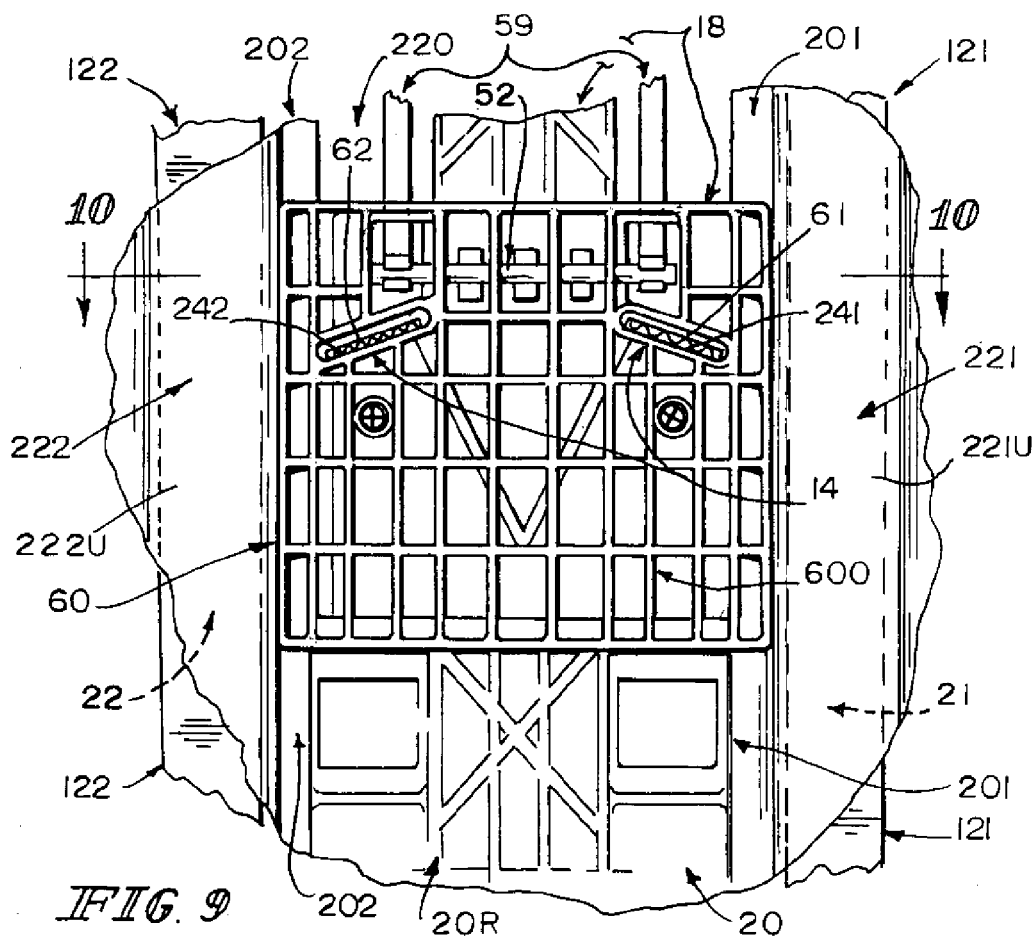

RIGIDIFYING SYSTEM FOR SINGLE SHELL JUVENILE VEHICLE SEAT

PRIORITY

This application claims priority under 35 U.S.C. §119(e) to U.S. Provisional Application Ser. No. 61/406,884, filed Oct. 26, 2010, which is expressly incorporated by reference herein.

BACKGROUND

The present disclosure relates to child restraints, and in particular, to juvenile seats for use on passenger seats in vehicles. More particularly, the present disclosure relates to rigidifying structures included in juvenile seats.

SUMMARY

According to the present disclosure, a child restraint includes a juvenile seat and a child-restraint harness coupled to the juvenile seat. The juvenile seat includes a seat shell formed to include a seat bottom and a seat back extending upwardly from the seat bottom.

In illustrative embodiments, the juvenile seat includes a rigidifying structure comprising two separate stiffener beams coupled to the seat shell. Fasteners are used to couple each stiffener beam to the seat bottom and back of the seat shell so that the stiffener beams are fixed in a stationary uniformly spaced-apart relation to one another. In illustrative embodiments, each stiffener beam is J-shaped to resemble a hockey stick.

In illustrative embodiments, the seat shell is a monolithic piece having a front side facing toward a child seated on the seat bottom and an oppositely facing rear side. The seat shell includes rearwardly extending first and second ribs. Each rib is formed to include a beam-receiver channel having an opening on the front side of the seat shell and extending from the front edge of the seat bottom to the top edge of the seat back. Each of the stiffener beams is inserted into a companion beam-receiver channel formed in one of the ribs through the opening formed in the front side of the seat shell and held in place by a fastener to rigidify the seat shell.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child restraint in accordance with the present disclosure for use on a passenger seat in a vehicle, with portions of a fabric covering broken away, showing a juvenile seat comprising a single seat shell formed to include spaced-apart first and second beam-receiver channels extending from the front of the seat bottom to the top of the seat back and opening on the front side of the seat shell and a J-shaped stiffener beam located in each of the beam-receiver channels and coupled to the seat shell to rigidify the juvenile seat and also showing an energy-dissipation system comprising air-filled ride-down pads mounted on a head cradle of an adjustable headrest included in the juvenile seat and mounted for up-and-down movement on the seat back;

FIG. 2 is a rear view of the child restraint of FIG. 1 with portions of the seat shell broken away to reveal (on the right) a portion of the J-shaped first stiffener beam in the first beam-receiver channel formed in a rearwardly extending first rib and (on the left) a portion of the J-shaped second stiffener beam in the second beam-receiver channel formed in a rearwardly extending second rib;

FIG. 3 is an enlarged sectional view taken along line 3-3 of FIG. 1 showing an upper section of the first stiffener beam in a portion of the first beam-receiver channel formed in the seat back of the seat shell;

FIG. 4 is an enlarged sectional view taken along lien 4-4 of FIG. 1 showing a lower section of the first stiffener beam in a portion of the first beam-receiver channel formed in the seat bottom of the seat shell;

FIG. 9 is an enlarged rear elevation view of a portion of the child restraint of FIG. 2 showing that the slidable cradle-retainer plate included in the headrest is formed to include a pair of angled, spaced-apart shoulder belt-receiving slots and is mounted for up-and-down movement with the head cradle relative to the seat back of the seat shell in the plate-receiver channel defined between the two ribs that are formed in the seat shell to include the first and second beam-receiver channels and on the two load-receiver rails formed in the seat back;

FIG. 10 is a sectional view taken along line 10-10 of FIG. 9 showing the location of the slidable cradle-retainer plate between the first and second ribs (and the stiffener beams anchored in the beam-receiver channels formed in the ribs) and showing mating engagement of the slidable cradle-retainer plate with the first and second Z-shaped load-receiver rails included in the seat shell;

1 and suggesting that loads generated by movement of a child seated and harnessed on the juvenile seat relative to the juvenile seat during exposure of a vehicle carrying the juvenile seat will be transferred by the child-restraint harness, slidable cradle-retainer plate, and seat shell to the first and second stiffener beams of the rigidified juvenile seat.

DETAILED DESCRIPTION

Figure 5:
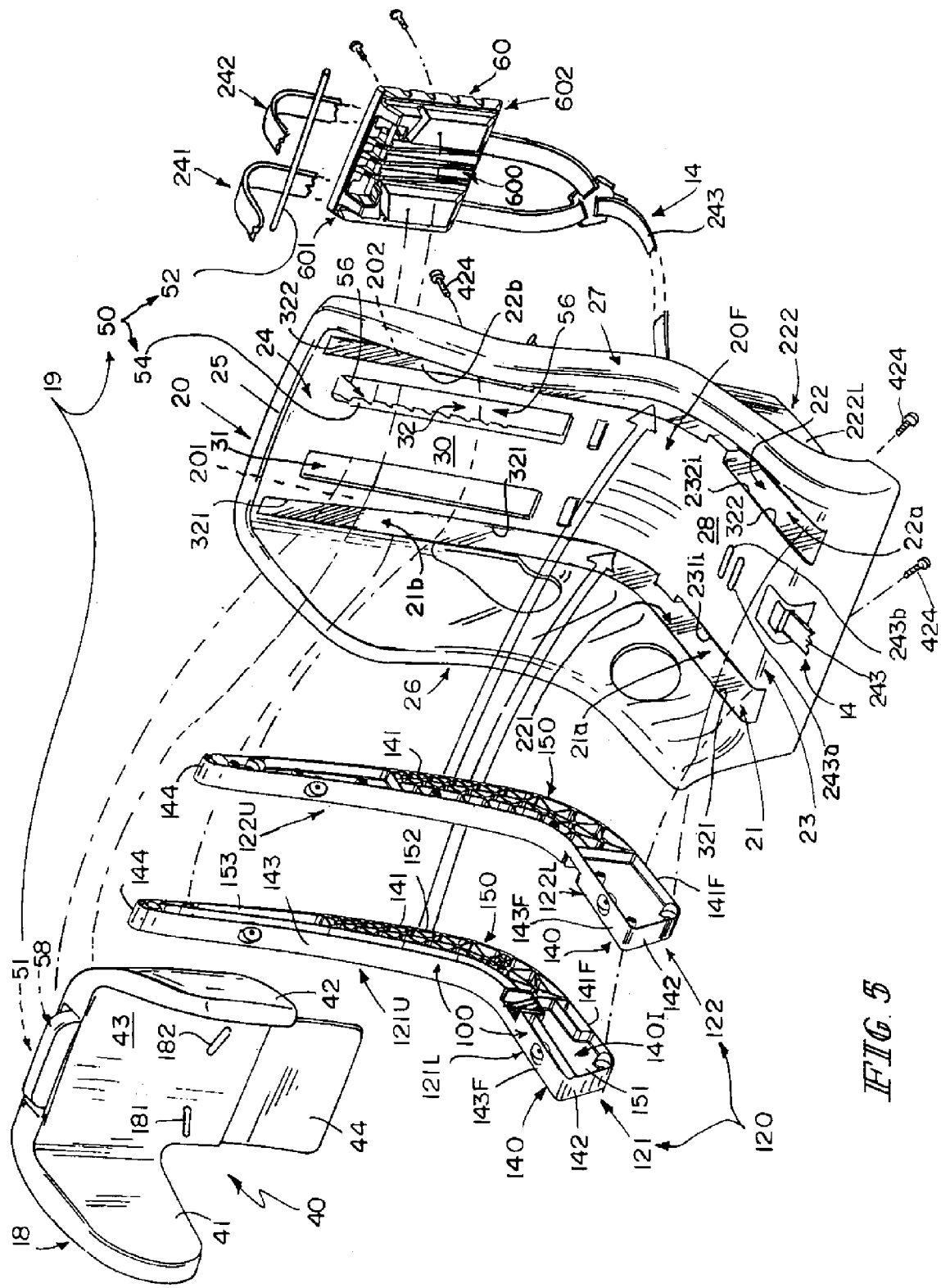
FIG. 5 is an exploded perspective assembly view showing many of the components included in the child restraint of FIG. 1 and showing the J-shaped first and second stiffener beams before they are placed in companion beam-receiver channels formed in the seat shell and retained in place using fasteners and showing (on the far right) a slidable cradle-retainer plate included in the adjustable headrest (and coupled to a child-restraint harness) and configured to be mounted on a rearwardly facing surface of the seat back as shown in FIG. 6 and fastened to the head cradle to move up and down therewith relative to the seat back of the seat shell.
Figure 11:
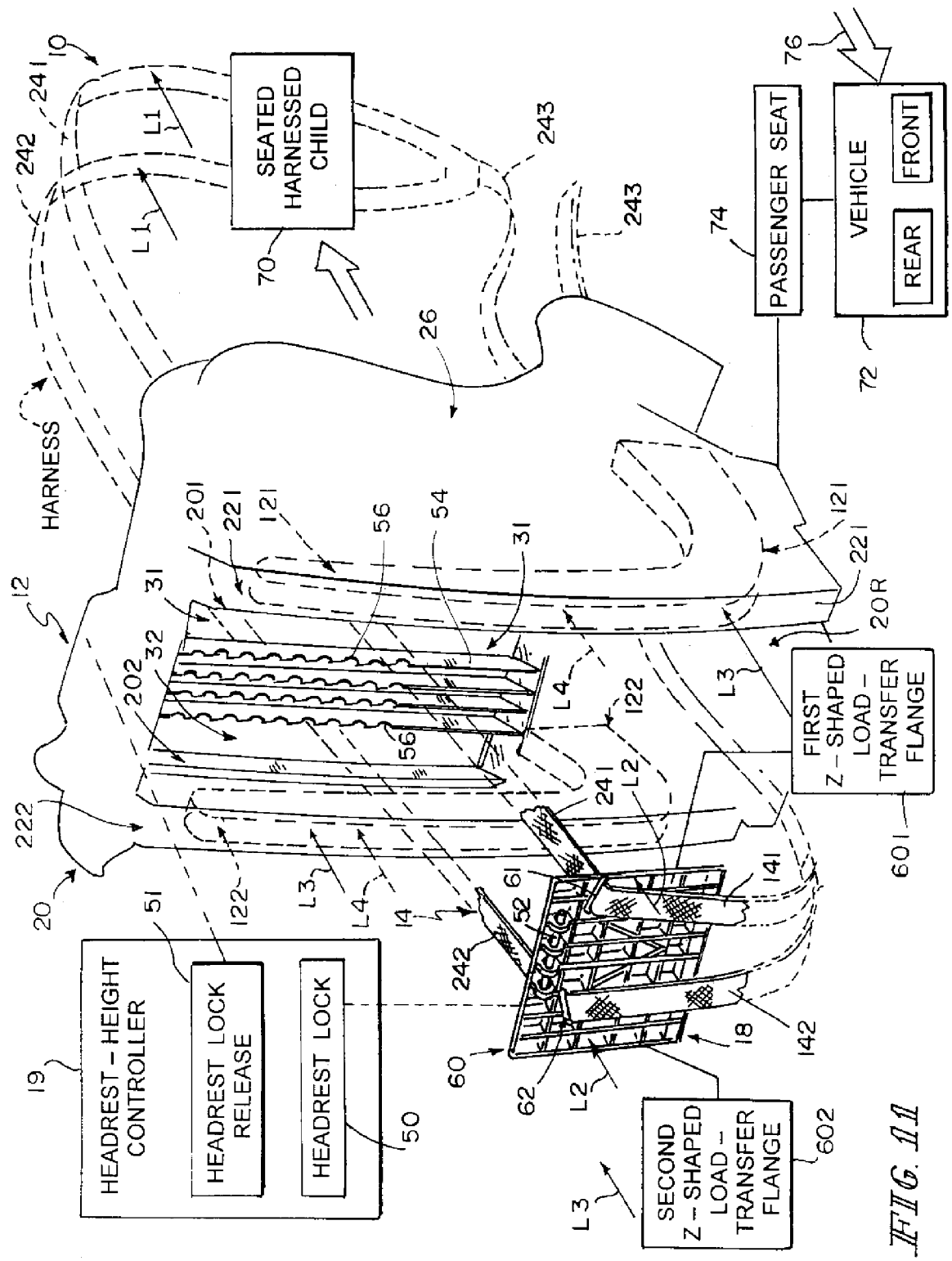
FIG. 11 is a diagrammatic perspective view showing several of the components included in the child restraint of FIG.

An illustrative child restraint 10 comprises a juvenile seat 12, a child-restraint harness 14, and an energy-dissipation system 16 as suggested in FIGS. 1, 5, and 11. In illustrative embodiments, juvenile seat 12 includes a seat shell 20 formed to include first and second beam-receiver channels 21, 22, a headrest 18, a headrest-height controller 19, and first and second stiffener beams 121, 122 as suggested in FIGS. 1, 2, and 5. Each of stiffener beams 121, 122 is inserted into one of the beam-receiver channels 21, 22 and coupled to seat shell 20 using fasteners 24 as suggested in FIG. 5 to rigidify juvenile seat 12 as suggested in FIGS. 1-4 and 11.

Headrest 18 is mounted for up-and-down movement on seat shell 20 and configured to carry air-filled ride-down pads 161, 162, 163, and 164 included in energy-dissipation system 16 as suggested in FIG. 1. In illustrative embodiments, headrest 18 includes a head cradle 40 and a slidable cradle-retainer plate 60 coupled to head cradle 40 to move therewith relative to a portion of seat shell 20 located between head cradle 40 and slidable cradle-retainer plate 60 as suggested in FIG. 5.

Headrest-height controller 19 is coupled to headrest 18 and seat shell 20 and is configured to control the height of headrest 18 relative to seat shell 20. Headrest-height controller 19 includes an actuator handle 58 located near the top of headrest 18 as suggested in FIG. 2. Actuator handle 58 can be moved by a caregiver to release headrest 18 from a locked position on a seatback 24 of seat shell 20 so that headrest 18 can be raised or lowered on a seat back 24. It is within the scope of this disclosure to use any suitable headrest-height controller.

Seat shell 20 includes a seat bottom 23 and a seat back 24 arranged to extend upwardly from seat bottom 23 and terminate at a top edge 25 as shown, for example, in FIG. 5. In illustrative embodiments, seat shell 20 also includes a first side-wing panel 26 coupled to one side of seat bottom 73 and seat back 24 and an opposing second side-wing panel 27 coupled to an opposite side of seat bottom 23 and seat back 24 as suggested in FIG. 5. Each of seat bottom 23 and seat back 24 is arranged to extend laterally between first and second side-wing panels 26, 27 and carry first and second stiffener beams 121, 122 as suggested in FIGS. 1 and 5.

In illustrative embodiments, seat shell 20 is a monolithic element made of a polypropylene material. A front side 20F of seat shell 20 is shown for example, in FIGS. 1 and 5. A rear side 20F of seat shell 20 is shown, for example, in FIGS. 2, 6, and 11. In illustrative embodiments, an outer fabric covering 28 included in juvenile seat 12 is mounted on seat shell 20 to cover seat shell 20 and first and second stiffener beams 121, 122 as suggested in FIG. 1.

Seat shell 20 is formed to include rearwardly extending first and second ribs 221, 222 as shown, for example, in FIGS. 1-6. In illustrative embodiments, lower portions 221L, 222L of ribs 221, 222 are formed in seat bottom 23 and upper portions 221U, 222U of ribs 221, 222 are formed in seat back 24 as shown, for example, in FIGS. 1-5. As suggested in FIG. 5, seat bottom 23 also includes a seat pad 28 located between lower portions of first and second ribs 221, 222 and seat back 24 includes a backrest 30 located between upper portions of first and second ribs 221, 222.

First rib 221 is formed to include first beam-receiver channel 21 as suggested in FIGS. 1-5. In illustrative embodiments, each of first rib 221, first stiffener beam 121, and first beam-receiver channel 21 is substantially J-shaped. As suggested in FIG. 5, seat bottom and back 23, 24 are formed to include an elongated first aperture 321 opening into the first beam-receiver channel 21 formed in first rib 221 of seat shell 20. In illustrative embodiments, first beam-receiver channel 21 has an opening formed in front side 20F of seat shell 20 as suggested in FIG. 5. As suggested in FIG. 5, during assembly of components included in juvenile seat 12, first stiffener beam 121 is inserted into first beam-receiver channel 21 and held in a stationary position therein by means of fasteners 24 coupled to first stiffener beam 121 and seat shell 20.

Second rib 222 is formed to include second beam-receiver channel 22 as suggested in FIGS. 1-5. In illustrative embodiments, each of second rib 222, second stiffener beam 122, and second beam-receiver channel 22 is substantially J-shaped. As suggested in FIG. 5, seat bottom and back 23, 24 are formed to include an elongated second aperture 322 opening into the second beam-receiver channel 22 formed in second rib 222 of seat shell 20. In illustrative embodiments, second beam-receiver channel 22 has an opening formed in front side 20F of seat shell 20 as suggested in FIG. 5. As suggested in FIG. 5, second stiffener beam 122 is inserted into second beam-receiver channel 22 during manufacture of juvenile seat 12 and held in a stationary position therein by means of fasteners 424 coupled to second stiffener beam 22 and seat shell 20.

A seat pad 28 included in seat bottom 23 is visible on front side 20F of seat shell 20 as suggested in FIG. 5. Seat pad 28 lies between lower portions of first and second beam-receiver channels 21, 22 and extends laterally from an inner edge 231*i* bordering first aperture 321 associated with first beam-receiver channel 21 to an inner edge 232*i* bordering second aperture 322 associated with second beam-receiver channel 22 as suggested in FIG. 5. Seat pad 28 is formed to include several crotch belt-receiving slots 281, 282 as suggested in FIG. 5.

Backrest 30 included in seat back 24 is visible on front side 20F of seat shell 20 as suggested in FIG. 5. Backrest 29 lies between upper portions of first and second beam-receiver channels 21, 22 and extends laterally from inner edge 231*i* bordering first aperture 321 associated with first beam-receiver channel 21 to inner edge 232*i* bordering second aperture 322 associated with second beam-receiver channel 22 as suggested in FIG. 5.

Each of first and second stiffener beams 121, 122 is substantially J-shaped to resemble a hockey stick as shown, for example, in FIG. 5. A lower portion 121L, 122L of each of first and second stiffener beams 121, 122 is a forwardly and generally horizontally extending blade. An upper portion 121U, 122U of each of first and second stiffener beams 121, 122 is an upwardly extending handle coupled to a rear end of a companion blade and arranged to cooperate with the companion blade to define an obtuse included angle 100 of about 100° therebetween as suggested in FIG. 5. Each stiffener beam 121, 122 is made of a polypropylene material in an illustrative embodiment.

Each of first and second stiffener beams 121, 122 includes a perimeter flange 140 and a rigidifying structure 150. Perimeter flange 140 is formed to include an interior space 401 bounded by perimeter flange 140 as suggested in FIG. 5.

Rigidifying structure 150 is located in interior space 1401 and coupled to perimeter flange 140.

Each perimeter flange 140 includes a J-shaped topside wall 143, a J-shaped underside wall 141 arranged to lie in spaced-apart relation to J-shaped topside wall 143, and a front wall 142 arranged to interconnect forward ends of each of J-shaped topside and underside walls 143, 141 as suggested in FIG. 5. In illustrative embodiments, each perimeter flange 140 also includes a peak wall 144 arranged to interconnect opposite rearward ends of each of J-shaped topside and underside walls 143, 141 as suggested in FIG. 5. In illustrative embodiments, front wall 142 is substantially flat and cooperates with a flat front portion 143F of J-shaped topside wall 143 to define an acute included angle of about 65° therebetween and with a flat front portion 141F of J-shaped underside wall 141 to define an obtuse included angle of about 110° therebetween as suggested in FIG. 5.

Rigidifying structure 150 of each of first and second stiffener beams 121, 122 includes upright first bottom and top plates 151, 153 and a first stiffener-beam internal truss system 152 in an illustrative embodiment as shown, for example, in FIG. 5. Upright first bottom plate 151 is coupled to each of J-shaped topside and underside walls 143, 141 of first stiffener beam 121. Upright first top plate 153 is coupled to each of J-shaped topside and underside walls 143, 141 of first stiffener beam 121. First stiffener-beam internal truss system 152 is arranged to interconnect upright first bottom and top plates 151, 153 as suggested in FIG. 5.

As suggested in FIG. 5, headrest 18 includes a head cradle 40 and a slidable cradle-retainer plate 60. Cradle-retainer plate 60 is coupled to head cradle 40 to move therewith relative to seat back 24 and to retain head cradle 40 in tethered relation to seat back 24 while allowing up-and-down movement of head cradle 40 relative to seat back 24.

Backrest 30 is formed to include a pair of upwardly extending and laterally spaced-apart belt travel channels 31, 32 shown, for example, in FIGS. 1, 5, and 11. These belt-travel channels 31, 32 are provided so that shoulder belts 241, 242 in child-restraint harness 14 can pass between front and rear sides 20F, 20R of seat shell 20. Headrest 18 is aligned with seat back 14 so that belt-receiving slots 181, 182 formed in head cradle 40 and belt-receiving slots 61, 62 formed in slidable cradle-retainer plate 60 of headrest 18 are always aligned with belt-travel channels 31, 32 formed in backrest 30 regardless of the position of headrest 18 on seat back 24.

A first shoulder belt 241 included in child-restraint harness 14 is arranged to extend through first belt-travel channel 31 as suggested in FIGS. 5 and 11. First shoulder belt 241 is also arranged to extend through a first shoulder belt-receiving slot 181 formed in head cradle 40 of headrest 18 as suggested in FIG. 5 and through a first shoulder belt-receiving slot 61 formed in slidable cradle-retainer plate 60 of headrest 18 as suggested in FIGS. 2, 6, and 11.

Figure 12:
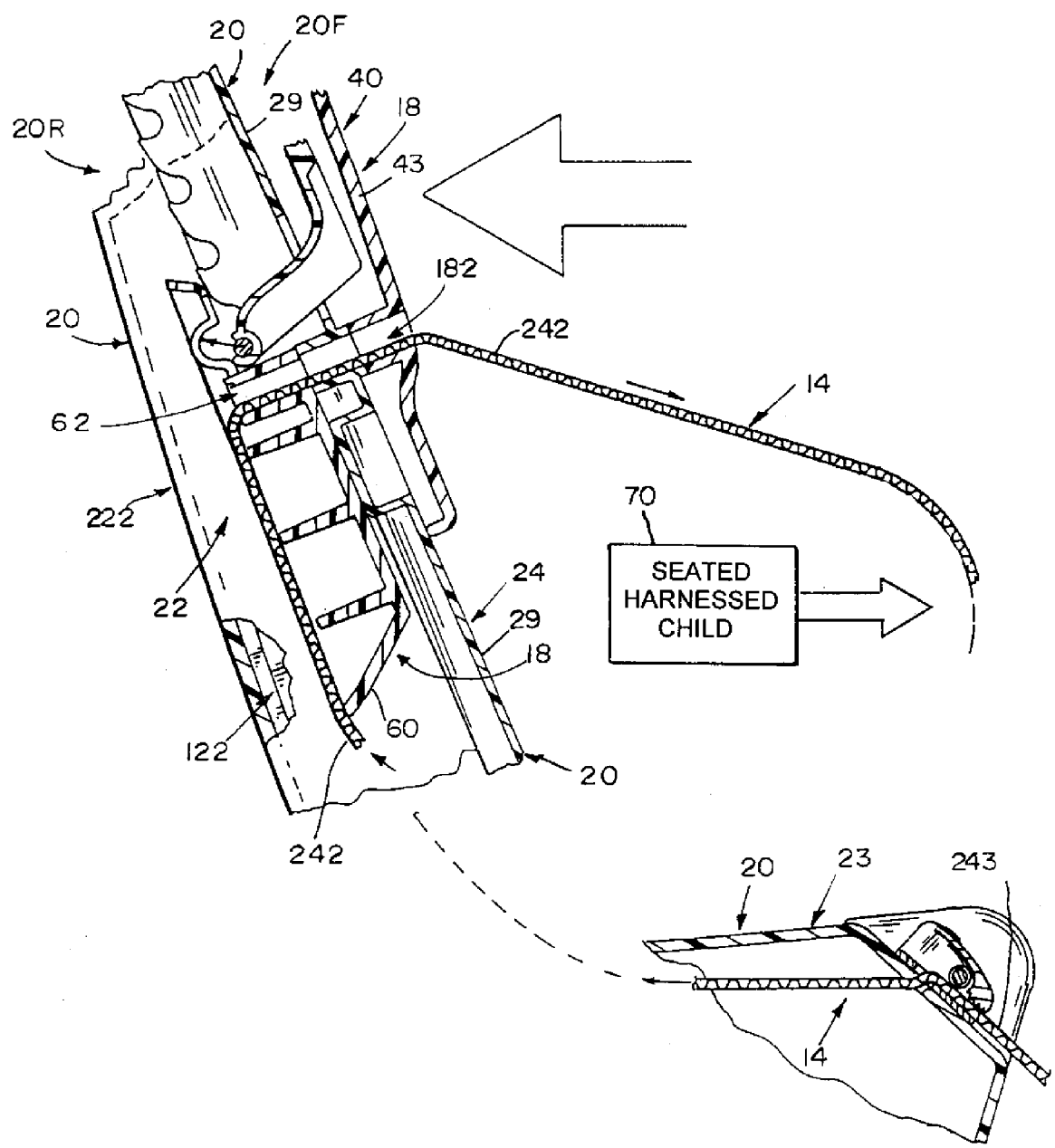
FIG. 12 is an enlarged partial sectional view taken along line 12-12 of FIG. 1, with portions broken away to show the first stiffener beam mounted in the first beam-receiver channel formed in the first upright rib included in the seat shell.

A second shoulder belt 242 included in child-restraint harness 14 is arranged to extend through second belt-travel channel 32 as suggested in FIG. 5. Second shoulder belt 142 is also arranged to extend through a second shoulder belt-receiving slot 182 formed in head cradle 40 of headrest 18 as suggested in FIGS. 5 and 12 and through a second shoulder belt-receiving slot 62 formed in slidable cradle-retainer plate 60 of headrest 18 as suggested in FIGS. 2, 6, and 11.

Head cradle 40 of headrest 18 includes a harness-control panel 43 formed to include first and second belt-receiving slots 181, 182. A plate mount 44 is coupled to harness-control panel 43 and arranged to extend downwardly toward seat bottom 23. Head cradle 40 also includes a first side wing 41 coupled to one side of harness-control panel 43 and a second side wing 42 coupled to another side of harness-control panel 43 as suggested in FIG. 5. Illustratively, a head of a child seated on juvenile seat 12 is positioned to lie between first and second side wings 41, 42 on harness-control panel 43.

Headrest 18 is mounted for up-and-down movement on seat back 24 of seat shell 20. The first and second shoulder belt-receiving slots 181, 182 of harness-control panel 43 of head cradle 40 and the first and second shoulder belt-receiving slots 61, 62 formed in slidable cradle-retainer plate 60 are aligned with their companion belt-travel channels 31, 32 formed in backrest 30 of seat back 24 as suggested in FIG. 5. Shoulder belt-receiving slots 181, 182 formed in head cradle 40 and shoulder belt-receiving slots 61, 62 formed in slidable cradle-retainer plate 60 operate to keep shoulder belts 241, 242 positioned at an appropriate height that corresponds to the vertical position of headrest 18 relative to seat back 24.

Child-restraint harness 14 is used to restrain a child sitting on seat shell 20. Child-restraint harness 14 in an illustrative embodiment is configured to include shoulder belts 241, 242, a crotch belt 243, and thigh belts (not shown). Belt-travel channels 31, 32 formed in backrest 30 allow shoulder belts 241, 242 to move with headrest 18 along the length of seat back 24 between raised and lowered positions.

Headrest-height controller 19 is included in juvenile seat 12 and is shown diagrammatically in FIG. 1. Headrest-height controller 19 is configured and arranged to vary the height of headrest 18 above seat bottom 23. An illustrative headrest-height controller 19 includes a headrest lock 50 and a headrest-lock release 51.

Headrest lock 50 comprises a movable headrest-retainer rod 52 and one or more upwardly extending notched plates 54 coupled to seat back 24. Each notched plate 54 is formed to include a series of companion rod-receiving notches 56 as suggested in FIG. 5.

Headrest-lock release 51 comprises a movable actuator handle 58 (see FIGS. 2 and 6) and suitable linkage means 59 (see FIGS. 9 and 10) interconnecting handle 58 and headrest-retainer rod 52 for selectively moving headrest-retainer rod 52 away from seat back 24 (at the option of a caregiver) to disengage rod-receiving notches 56 to free headrest 18 to be moved up or down on seat back 24 between raised and lowered positions in response to movement of actuator handle 58 relative to seat back 24 of seat shell 20 by a caregiver. Whenever headrest-retainer rod 52 is deposited by headrest-lock release 51 into rod-receiving notches 56, headrest 18 is retained in a selected stationary position above seat bottom 23 of seat shell 20.

Reference is hereby made to U.S. application Ser. No. 12/726,128, filed on Mar. 17, 2010, which reference is hereby incorporated in its entirety therein, for disclosures relating to headrest-height controllers. In an illustrative process, a caregiver can operate headrest-height controller 19 to unlock and lock headrest 18 so as to change the height of headrest 18 above seat bottom 23. A caregiver can squeeze or otherwise move handle 58 toward seat shell 20 to cause linkage means 59 to move headrest-retainer rod 52 relative to notched plates 54 and cradle-retainer plate 60 to disengage notches 56 formed in notched plates 54. Then the caregiver can lift headrest 18 to a higher position on seat back 24 or drop headrest 18 to a lower position on seat back 24 and then release actuator handle 58 to allow linkage means 59 to move (under, e.g., a spring force) to place headrest-retainer rod 52 in another of the notches 56 corresponding to a selected height above seat bottom 23.

The slidable cradle-retainer plate 60 of headrest 18 is configured and arranged to assist in transferring loads applied to child-restraint harness 14 by a child 70 seated in juvenile seat 12 to first and second stiffener beams 121, 122 of juvenile seat 12 during exposure of a vehicle 72 having a passenger seat 74 carrying juvenile seat 12 to an external impact force 76 as suggested in FIG. 11. During such an event, relative movement of the seated harnessed child 70 and juvenile seat causes, in series (1) a load L1 to be applied by child 70 to first and second shoulder belts 241, 242; (2) a load L2 to be applied by belts 241, 242 to slidable cradle-retainer plate 60 of headrest 18; (3) a load L3 to be applied by slidable cradle-retainer plate 60 to seat shell 20; and (4) a load L4 to be applied by seat shell 20 to first and second stiffener beams 121, 122 as suggested diagrammatically in FIG. 11. As such, the rigidifying structures (e.g., first and second stiffener beams 121, 122) carry loads applied to juvenile seat 12 during exposure of juvenile seat 12 to an external impact force 76.

Figure 6:
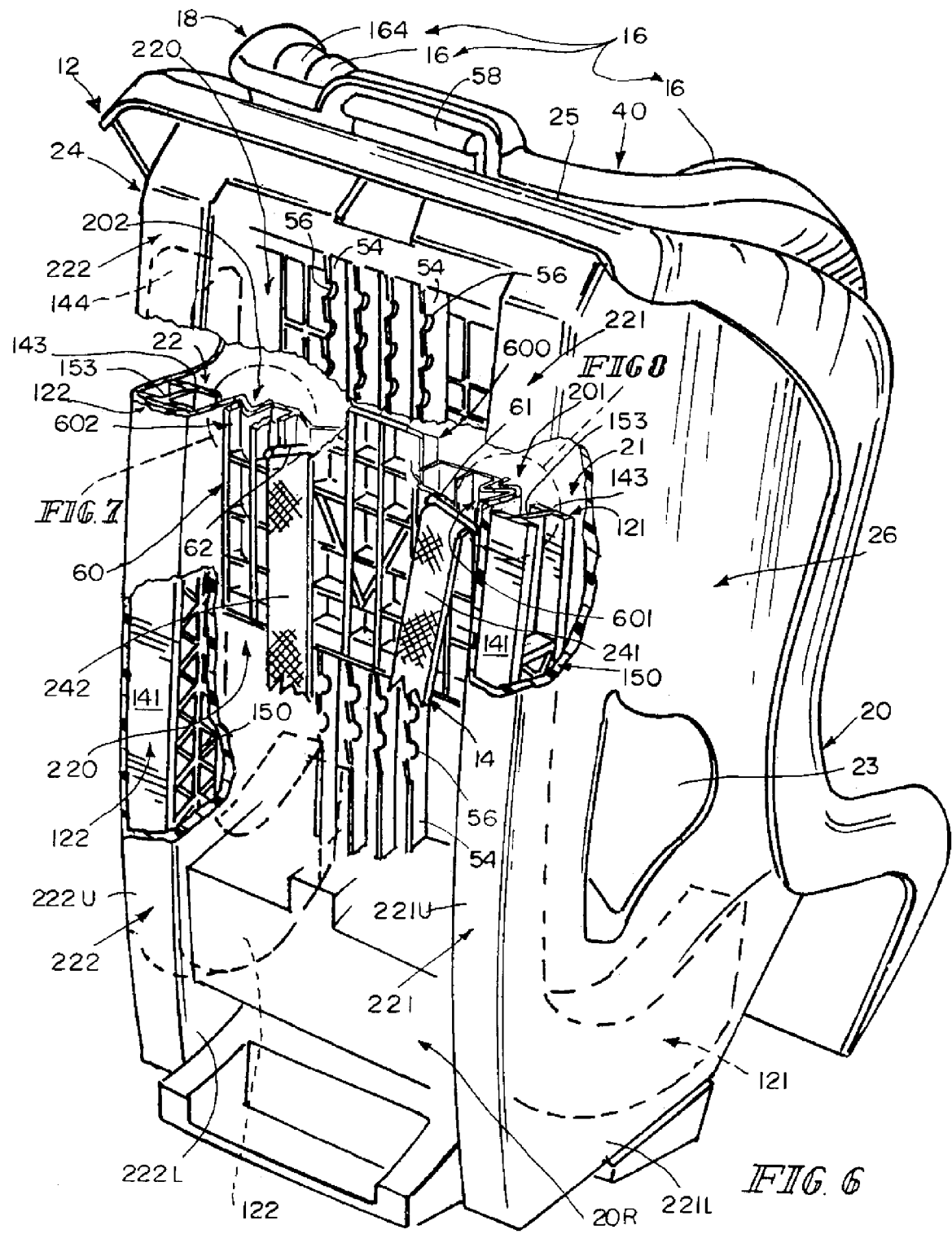
FIG. 6 is an enlarged view of the child restraint shown in FIG. 2 with portions broken away to show the first and second stiffener beams held in place in companion beam-receiver channels and showing that the seat shell includes a rearwardly extending first rib (on the right) that is formed to define the first beam-receiver channel and a rearwardly extending second rib (on the left) that is formed to define the second beam-receiver channel and showing that the slidable cradle-retainer plate included in the adjustable headrest is mounted for up-and-down movement on the rearwardly facing surface of the seat back in a plate-receiver channel provided between the first and second ribs to raise and lower shoulder belts included in the child-restraint harness and coupled to the slidable cradle-retainer plate.

As shown in FIG. 6, slidable cradle-retainer plate 60 of headrest 18 includes a central bed 600 formed to include first and second belt-receiving slots 61, 62 and first and second Z-shaped load-transfer flanges 601, 602. First Z-shaped load-transfer flange 601 is coupled to one side of central bed 600 and arranged to mate with and slide on a complementary companion first Z-shaped load-transfer rail 201 included in seat shell 20 and arranged to lie next to first rib 221 as suggested in FIGS. 9 and 10. Second Z-shaped load-transfer flange 602 is coupled to an opposite side of central bed 600 and arranged to mate with and slide on a complementary companion second Z-shaped load-transfer rail 202 included in seat shell 20 and arranged to lie next to second rib 221 as suggested in FIGS. 9 and 10.

Figure 8:
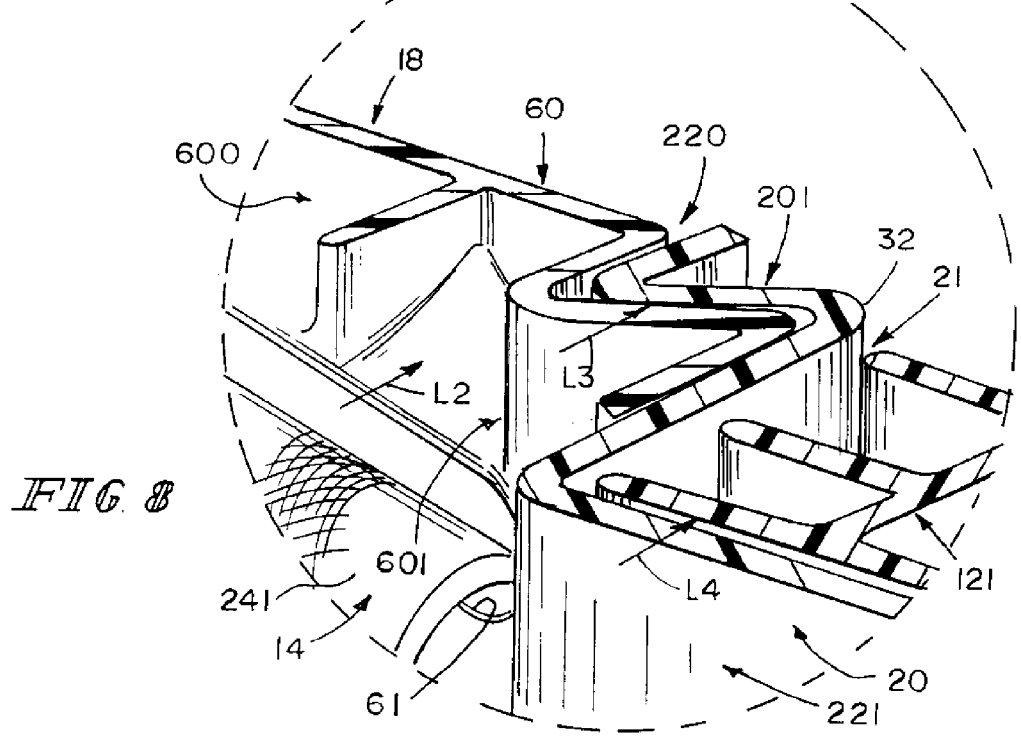
FIG. 8 is an enlarged partial perspective view taken from a circled region of FIG. 6 showing mating engagement of a second Z-shaped load-transfer flange on a near side of the slidable cradle-retainer plate with a second Z-shaped load-receiver rail formed in the seat shell and located near a second shoulder belt and a portion of the second stiffener beam.

The location of slidable cradle-retainer plate 60 between first and second ribs 221, 222 and stiffener beams 121, 122 anchored in beam-receiver channels 21, 22 formed in ribs 221, 222 is shown, for example, in FIG. 10. Also, mating engagement of slidable cradle-retainer plate 60 with first and second Z-shaped load-receiver rails 201, 202 included in seat shell 20 is shown in FIGS. 8, 9, and 10. A diagrammatic perspective view provided in FIG. 11 shows several of the components included in child restraint 10 and suggests that loads generated by movement of a child 70 seated and harnessed on juvenile seat 12 during exposure of a vehicle 72 carrying juvenile seat 12 will be transferred by child-restraint harness 14, slidable cradle-retainer plate 60, and seat shell 20 to first and second stiffener beams 121, 122 of the rigidified juvenile seat 12.

Child restraint 10 includes a juvenile seat 12 and a rigidifying truss 120 as shown, for example, in FIGS. 1 and 5. Juvenile seat 12 includes a seat shell 20 formed to include first and second beam-receiver channels 21, 22. Rigidifying truss 120 includes a first stiffener beam 121 located in first beam-receiver channel 21 and coupled to seat shell 20 to rigidify a first side of seat shell 20 and a separate second stiffener beam 122 located in second beam-receiver channel 22 and coupled to seat shell 20 to lie in spaced-apart relation to first stiffener beam 121 and to rigidify an opposite second side of seat shell 20 as suggested in FIGS. 1 and 5.

Seat shell 20 includes a seat bottom 23 and a seat back 24 extending upwardly from seat bottom 23 as suggested in FIGS. 1 and 5. Seat bottom 23 is formed to include a bottom section 21a, 22a of each of first and second beam-receiver channels 21, 22 as shown in FIG. 5. Seat back 24 is formed to include a back section 21b, 22b of each of first and second beam-receiver channels 21, 22 as shown in FIG. 5.

Each of first and second stiffener beams 121, 122 is substantially J-shaped as shown, for example, in FIG. 5. First stiffener beam 121 includes a forwardly extending first blade 121L located in bottom section 21a of first beam-receiver channel 21 and an upwardly extending first handle 121U coupled to a rear end of first blade 121L and located in back section 21b of first beam-receiver channel 21 as suggested in FIG. 5. Second stiffener beam 122 includes a forwardly extending second blade 122L located in bottom section 22a of second beam-receiver channel 22 and an upwardly extending second handle 122U coupled to a rear end of second blade 122L and located in back section 22b of second beam-receiver channel 22 as suggested in FIG. 5.

Seat bottom 23 includes a seat pad 28 located between bottom sections 121L, 122L of first and second beam-receiver channels 21, 22 as shown, for example, in FIG. 5. Seat pad 28 is formed to include a crotch belt-receiving slot 243a, 243b configured to provide means for receiving therein a crotch belt 243 included in a child-restraint harness 14 coupled to seat shell 20 as suggested in FIG. 5.

Seat shell 20 further includes a first side-wing panel 26 coupled to one side of seat bottom 23 and a second side-wing panel 27 coupled to an opposite side of seat bottom 23 as shown in FIG. 5. Bottom section 21a of first beam-receiver channel 21 is arranged to lie between first side-wing panel 26 and seat pad 28. Bottom section 22a of second beam-receiver channel 22 is arranged to lie between seat pad 28 and second side-wing panel 27.

Seat back 24 includes a backrest 30 located between back sections 21b, 22b of first and second beam-receiver channels 21, 22 as shown, for example, in FIG. 5. Backrest 30 is formed to include slot means 31, 32 for receiving therein first and second shoulder belts 241, 242 included in a child-restraint harness 14 coupled to seat shell 20. Back section 21b of first beam-receiver channel 21 is arranged to lie between first side-wing panel 26 and backrest 30. Back section 22b of second beam-receiver channel 22 is arranged to lie between backrest 30 and second side-wing panel 27.

Seat pad 28 is arranged to underlie a child seated on seat shell 20. Seat pad 28 includes an upwardly facing surface arranged to provide means for supporting buttocks of a child seated on seat pad 28.

Backrest 30 is arranged to extend upwardly from seat pad 28 to lie behind a child seated on seat shell 20. Backrest 30 includes a forwardly facing surface arranged to provide means for supporting a back of a child seated on seat pad 28.

Seat shell 20 also includes first and second ribs 221, 222 as shown, for example, in FIGS. 2, 5, and 6. First rib 221 is coupled to seat pad 28 and backrest 30 and formed to include first beam-receiver channel 21. Second rib 222 is coupled to seat pad 28 and backrest 30 and formed to include second beam-receiver channel 22.

Each of first and second ribs 221, 222 includes a lower rib portion 221L, 222L arranged to extend downwardly away from the upwardly facing surface of seat pad 28 to locate a bottom section 21a, 22b of each of first and second beam-receiver channels 21, 22 below the upwardly facing surface of seat pad 28 as suggested in FIG. 5. Each of first and second ribs 221, 222 includes an upper rib portion 221U, 222U arranged to extend rearwardly away from the forwardly facing surface of first and second beam-receiver channels 21, 22 to locate a back section 21b, 22b of each of first and second beam-receiver channels 21, 22 behind the forwardly facing surface of backrest 30 as suggested in FIG. 5.

Seat pad 28 is located between lower rib portions 221L, 222L of first and second ribs 221, 222 as shown in FIG. 5. Backrest 30 is located between upper rib portions 221U, 222U of first and second ribs 221, 222 as shown in FIG. 5.

Seat shell 20 has a front side 20F formed to include a first aperture 321 opening into first beam-receiver channel 21 and a second aperture 322 opening into second beam-receiver channel 22 as shown in FIG. 5. Seat shell 20 also has an oppositely facing rear side 20R coupled to first and second ribs 221, 222 as suggested in FIGS. 2 and 6. Each of first and second stiffener beams 221, 222 includes a blade arranged to extend alongside seat pad 28 and a handle arranged to extend upwardly away from the blade alongside backrest 30 as suggested in FIG. 5.

Child restraint 10 further includes a child-restraint harness 14 associated with the seat shell 20 as suggested in FIG. 5. Juvenile seat 12 further includes an adjustable headrest 18 including a cradle-retainer plate 60 mounted for up-and-down movement on a rearwardly facing surface of backrest 30 in a plate-receiver channel 220 (see FIGS. 2, 6, and 9) provided between first and second ribs 221, 222 to raise and lower first and second shoulder belts 241, 242 included in child-restraint harness 14 and coupled to slidable cradle-retainer plate 60. Adjustable headrest 18 further includes a head cradle 40 arranged to lie above seat pad 28 to support the head of a child seated on seat pad 28 as suggested in FIGS. 1 and 5 and coupled to cradle-retainer plate 60 to move up and down therewith relative to backrest 30 as suggested in FIGS. 5 and 10.

Backrest 30 is formed to include first and second belt-receiver slots 31, 32 as shown in FIG. 5. First belt-receiving slot 31 is located between first and second ribs 221, 222 and arranged to receive first shoulder belt 241 therein during up-and-down movement of cradle-retainer plate 60 relative to backrest 30. Second belt-receiver slot 32 is located between first belt-receiver slot 31 and second rib 222 and arranged to receive second shoulder belt 242 therein during up-and-down movement of cradle-retainer plate 60 relative to backrest 30.

Seat shell 20 further includes first and second load-receiver rails 201, 202 as shown, for example, in FIGS. 6-10. First load-receiver rail 201 is arranged to lie alongside first rib 221 in plate-receiver channel 220. Second load-receiver rail 202 arranged to lie alongside second rib 222 in plate-receiver channel 60 in spaced-apart relation to first load-receiver rail 201 as suggested in FIGS. 9 and 10.

Figure 7:
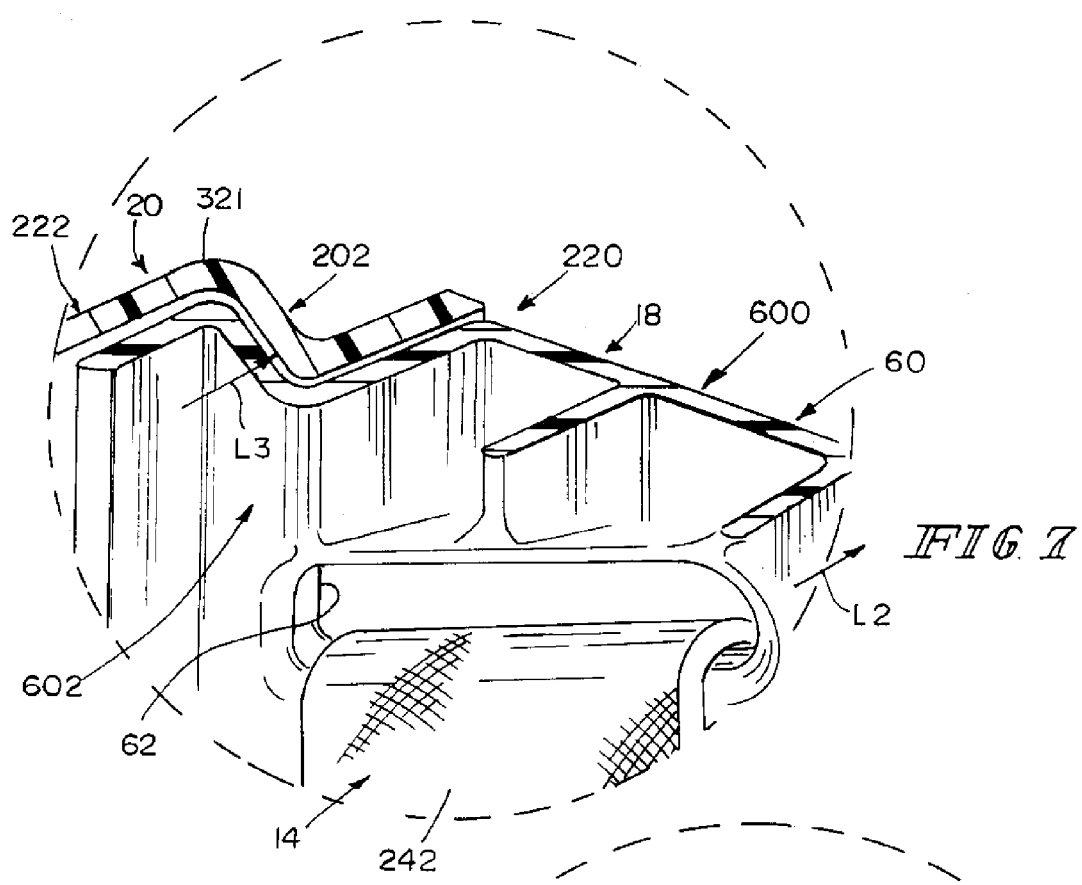
FIG. 7 is an enlarged partial perspective view taken from a circled region of FIG. 6 showing mating engagement of a first Z-shaped load-transfer flange on a far side of the slidable cradle-retainer plate with a first Z-shaped load-receiver rail formed in the seat shell and located near a first shoulder belt.

Cradle-retainer plate 60 includes first and second load-transfer flanges 601, 602 as suggested in FIGS. 7, 8, and 10. First load-transfer flange 601 is arranged to slide in mating engagement on first load-receiver rail 201 during up-and-down movement of cradle-retainer plate 60 relative to backrest 30 to provide first means for transferring a load applied to first shoulder belt 241 by a child seated on seat pad 28 to first stiffener beam 221 during exposure of a vehicle having a passenger seat carrying juvenile seat 12 to an external impact force. Second load-transfer flange 602 is arranged to slide in mating engagement on second load-receiver rail 202 during up-and-down movement of cradle-retainer plate 60 relative to backrest 30 to provide second means for transferring a load applied to second shoulder belt 242 by a child seated on seat pad 28 to second stiffener beam 222 during exposure of a vehicle having a passenger seat carrying juvenile seat 12 to an external impact force.

Seat shell 20 has a front side 20F arranged to face toward a child seated in seat shell 20 as suggested in FIG. 1. Front side 20F is formed to include a first aperture 321 opening into first beam-receiver channel 21 and a second aperture 322 opening into second beam-receiver channel 22 as shown in FIG. 5. Seat bottom 23 is formed to include a portion of each of first and second apertures 321, 322. Seat back 24 is formed to include a portion of each of first and second apertures 321, 322.

The invention claimed is:

1. A child restraint comprising:
a juvenile seat including a seat shell having a seat bottom and a backrest, the seat bottom formed to include first and second beam-receiver channels, and a rigidifying truss including a first stiffener beam located in the first beam-receiving channel and coupled to the seat shell to rigidify a first side of the seat shell and a separate second stiffener beam located in the second beam-receiving channel and coupled to the seat shell to lie in spaced-apart relation to the first stiffener beam and to rigidify an opposite second side of the seat shell.

2. The child restraint of claim 1, wherein the seat shell includes a seat bottom and a seat back extending upwardly from the seat bottom, the seat bottom is formed to include a bottom section of each of the first and second beam-receiver channels, and the seat back is formed to include a back section of each of the first and second beam-receiver channels.

3. The child restraint of claim 2, wherein each of the first and second stiffener beams is substantially J-shaped, the first stiffener beam includes a forwardly extending first blade located in the bottom section of the first beam-receiver channel and an upwardly extending first handle coupled to a rear end of the first blade and located in the back section of the first beam-receiver channel, and the second stiffener beam includes a forwardly extending second blade located in the bottom section of the second beam-receiver channel and an upwardly extending second handle coupled to a rear end of the second blade and located in the back section of the second beam-receiver channel.

4. The child restraint of claim 3, wherein the seat bottom includes a seat pad located between the bottom sections of the first and second beam-receiver channels and formed to include a crotch belt-receiving slot configured to provide means for receiving therein a crotch belt included in a child-restraint harness coupled to the seat shell.

5. The child restraint of claim 4, wherein the seat shell further includes a first side-wing panel coupled to one side of the seat bottom and a second side-wing panel coupled to an opposite side of the seat bottom, the bottom section of the first beam-receiver channel is arranged to lie between the first side-wing panel and the seat pad, and the bottom section of the second beam-receiver channel is arranged to lie between the seat pad and the second side-wing panel.

6. The child restraint of claim 3, wherein the seat back includes a backrest located between the back sections of the first and second beam-receiver channels and formed to include slot means for receiving therein first and second shoulder belts included in a child-restraint harness coupled to the seat shell.

7. The child restraint of claim 6, wherein the seat shell further includes a first side-wing panel coupled to one side of the seat back and a second side-wing panel coupled to an opposite side of the seat back, the back section of the first beam-receiver channel is arranged to lie between the first side-wing panel and the backrest, and the back section of the second beam-receiver channel is arranged to lie between the backrest and the second side-wing panel.

8. The child restraint of claim 1, wherein the seat shell includes a seat pad arranged to underlie a child seated on the seat shell, a backrest arranged to extend upwardly from the seat pad to lie behind a child seated on the seat shell, a first rib coupled to the seat pad and the backrest and formed to include the first beam-receiver channel, and a second rib coupled to the seat pad and the backrest and formed to include the second beam-receiver channel.

9. The child restraint of claim 8, wherein the seat pad is formed to include a crotch belt-receiving slot configured to provide means for receiving therein a crotch belt included in a child-restraint harness coupled to the seat shell and the backrest is formed to include slot means for receiving therein first and second shoulder belts included in the child-restraint harness.

10. The child restraint of claim 8, wherein the seat pad includes an upwardly facing surface arranged to provide means for supporting buttocks of a child seated on the seat pad, the backrest includes a forwardly facing surface arranged to provide means for supporting a back of a child seated on the seat pad, each of the first and second ribs includes a lower rib portion arranged to extend downwardly away from the upwardly facing surface of the seat pad to locate a bottom section of each of the first and second beam-receiver channels below the upwardly facing surface of the seat pad, and each of the first and second ribs includes an upper rib portion arranged to extend rearwardly away from the forwardly facing surface of the first and second beam-receiver channels to locate a back section of each of the first and second beam-receiver channels behind the forwardly facing surface of the backrest.

11. The child restraint of claim 10, wherein each of the first and second stiffener beams is substantially J-shaped, the first stiffener beam includes a forwardly extending first blade located in the bottom section of the first beam-receiver channel and an upwardly extending first handle coupled to a rear end of the first blade and located in the back section of the first beam-receiver channel, and the second stiffener beam includes a forwardly extending second blade located in the bottom section of the second beam-receiver channel and an upwardly extending second handle coupled to a rear end of the second blade and located in the back section of the second beam-receiver channel.

12. The child restraint of claim 10, wherein the seat pad is located between the lower rib portions of the first and second ribs and the backrest is located between the upper rib portions of the first and second fibs.

13. The child restraint of claim 8, wherein the seat shell has a front side formed to include a first aperture opening into the first beam-receiver channel and a second aperture opening into the second beam-receiver channel and the seat shell has an oppositely facing rear side coupled to the first and second fibs.

14. The child restraint of claim 13, wherein each of the first and second stiffener beams includes a blade arranged to extend alongside the seat pad and a handle arranged to extend upwardly away from the blade alongside the backer rest.

15. The child restraint of claim 8, further comprising a child-restraint harness associated with the seat shell and wherein the juvenile seat further includes an adjustable headrest including a cradle-retainer plate mounted for up-and-down movement on a rearwardly facing surface of the backrest in a plate-receiver channel provided between the first and second ribs to raise and lower first and second shoulder belts included in the child-restraint harness and coupled to the slidable cradle-retainer plate and the adjustable headrest further includes a head cradle arranged to lie above the seat pad to support the head of a child seated on the seat pad and coupled to the cradle-retainer plate to move up and down therewith relative to the backrest.

16. The child restraint of claim 15, wherein the backrest is formed to include a first belt-receiver slot located between the first and second ribs and arranged to receive the first shoulder belt therein during up-and-down movement of the cradle-retainer plate relative to the backrest and a second belt-receiver slot located between the first belt-receiver slot and the second rib and arranged to receive the second shoulder belt therein during up-and-down movement of the cradle-retainer plate relative to the backrest.

17. The child restraint of claim 15, wherein the seat shell includes a first load-receiver rail arranged to lie alongside the first rib in the plate-receiver channel and a second load-receiver rail arranged to lie alongside the second rib in the plate-receiver channel in spaced-apart relation to the first load-receiver rail and the cradle-retainer plate includes a first load-transfer flange arranged to slide in mating engagement on the first load-receiver rail during up-and-down movement of the cradle-retainer plate relative to the backrest to provide first means for transferring a load applied to the first shoulder belt by a child seated on the seat pad to the first stiffener beam during exposure of a vehicle having a passenger seat carrying the juvenile seat to an external impact force and a second load-transfer flange arranged to slide in mating engagement on the second load-receiver rail during up-and-down movement of the cradle-retainer plate relative to the backrest to provide second means for transferring a load applied to the second shoulder belt by a child seated on the seat pad to the second stiffener beam during exposure of a vehicle having a passenger seat carrying the juvenile seat to an external impact force.

18. The child restraint of claim 1, wherein the seat shell has a front side arranged to face toward a child seated in the seat shell and formed to include a first aperture opening into the first beam-receiver channel and a second aperture opening into the second beam-receiver channel.

19. The child restraint of claim 18, wherein the seat shell includes a seat bottom and a seat back extending upwardly from the seat bottom, the seat bottom is formed to include a portion of each of the first and second apertures, and the seat back is formed to include a portion of each of the first and second apertures.

20. The child restraint of claim 1, wherein the seat shell is a monolithic piece having a front side facing toward a child seated on the seat bottom and an oppositely facing rear side and rearwardly extending first and second ribs coupled to the rear side and each rib is formed to include one of the beam-receiver channels having an opening on the front side of the shell and receiving one of the first and second stiffener beams therein.

21. The child restraint of claim 20, further comprising a child-restraint harness associated with the seat shell and wherein the juvenile seat further includes an adjustable headrest including a slidable cradle-retainer plate mounted for up-and-down movement on a rearwardly facing surface of the seat back in a plate-receiver channel provided between the first and second ribs to raise and lower first and second shoulder belts included in the child-restraint harness and coupled to the slidable cradle-retainer plate and the adjustable headrest further includes a head cradle arranged to lie above the seat pad to support the head of a child seated on the seat pad and coupled to the slidable cradle-retainer plate to move up and down therewith relative to the seat back.

22. The child restraint of claim 21, wherein the seat back is formed to include a first belt-receiver slot located between the first and second ribs and arranged to receive the first shoulder belt therein during up-and-down movement of the slidable cradle-retainer plate relative to the seat back backrest and a second belt-receiver slot located between the first belt-receiver slot and the second rib and arranged to receive the second shoulder belt therein during up-and-down movement of the cradle-retainer plate relative to the seat back.

23. The child restraint of claim 21, wherein the seat shell includes a first load-receiver rail arranged to lie alongside the first rib in the plate-receiver channel and a second load-receiver rail arranged to lie alongside the second rib in the plate-receiver channel in spaced-apart relation to the first load-receiver rail and the slidable cradle-retainer plate includes a first load-transfer flange arranged to slide in mating engagement on the first load-receiver rail during up-and-down movement of the slidable cradle-retainer plate relative to the seat back to provide first means for transferring a load applied to the first shoulder belt by a child seated on the seat pad to the first stiffener beam during exposure of a vehicle having a passenger seat carrying the juvenile seat to an external impact force and a second load-transfer flange arranged to slide in mating engagement on the second load-receiver rail during up-and-down movement of the slidable cradle-retainer plate relative to the seat back to provide second means for transferring a load applied to the second shoulder belt by a child seated on the seat pad to the second stiffener beam during exposure of a vehicle having a passenger seat carrying the juvenile seat to an external impact force.

24. The child restraint of claim 1, wherein each of the first and second stiffener beams is J-shaped and includes a blade arranged to extend along the seat bottom and a handle coupled to the blade and arranged to extend upwardly from the handle along the seat back.

\* \* \* \* \*